United States Patent
Wey et al.

(10) Patent No.: US 6,810,175 B1
(45) Date of Patent: Oct. 26, 2004

(54) OFF-AXIS MODE SCRAMBLER

(75) Inventors: Jun Shan Wey, Sammamish, WA (US); Robert M. Pierce, Woodinville, WA (US); Eric C. Eisenberg, Redmond, WA (US); Jorah R. Wyer, Seattle, WA (US)

(73) Assignee: Terabeam Corporation, Redmond, WA (US)

( * ) Notice: Subject to any disclaimer, the term of this patent is extended or adjusted under 35 U.S.C. 154(b) by 166 days.

(21) Appl. No.: 10/128,953

(22) Filed: Apr. 22, 2002

(51) Int. Cl.[7] .............................. G02B 6/26; G02B 6/38
(52) U.S. Cl. .............................. 385/28; 385/27; 385/39; 385/50; 385/59; 385/93; 385/96; 385/124
(58) Field of Search .......................... 385/27, 28, 33, 385/39, 43, 59, 89, 90, 93, 96, 88, 91, 92, 29

(56) References Cited

U.S. PATENT DOCUMENTS

| | | | |
|---|---|---|---|
| 4,307,934 A | 12/1981 | Palmer | |
| 4,575,181 A | 3/1986 | Ishikawa | |
| 5,187,759 A | * 2/1993 | DiGiovanni et al. | 385/27 |
| 6,304,695 B1 | 10/2001 | Shekel | |
| 6,609,834 B2 | * 8/2003 | Cunningham et al. | 385/60 |

FOREIGN PATENT DOCUMENTS

WO PCT/US03/12251 10/2003

* cited by examiner

Primary Examiner—John R. Lee
Assistant Examiner—Paul M. Gurzo
(74) Attorney, Agent, or Firm—Blakely, Sokoloff, Taylor, & Zafman LLP

(57) ABSTRACT

An apparatus and method for generating a mode-scrambled optical signal. A laser beam source directs an optical signal into a free end of a first segment of multimode fiber comprising a graded-index (GI) fiber core at an offset from the centerline of the core, generating an offset-launch condition. The first segment of multimode fiber is operatively coupled into a second segment of multimode fiber comprising a step-index (SI) fiber core. As the offset-launched optical signal passes through the first and second segments of multimode fiber, the optical signal is converted into a mode-scrambled optical signal having a substantially-filled numerical aperture.

20 Claims, 6 Drawing Sheets

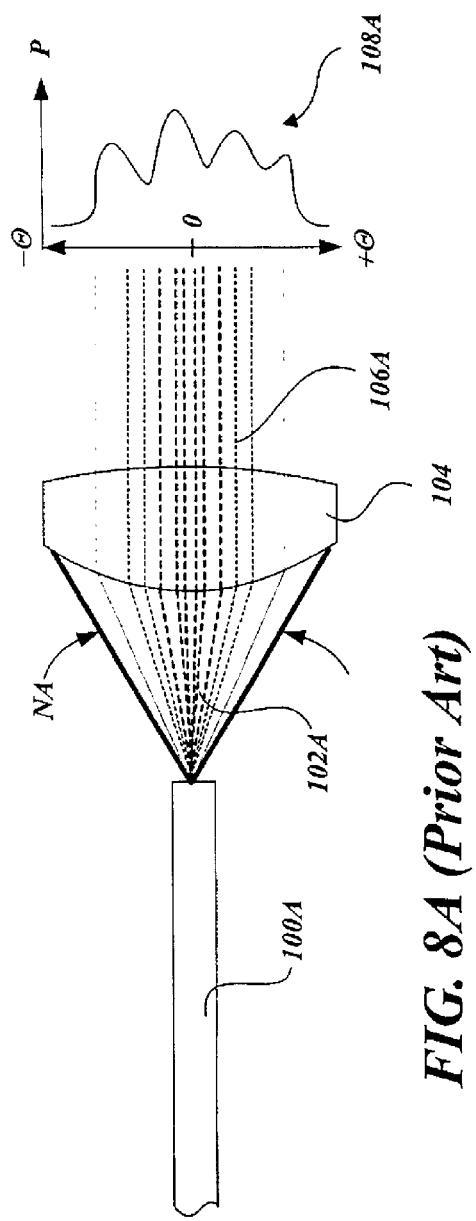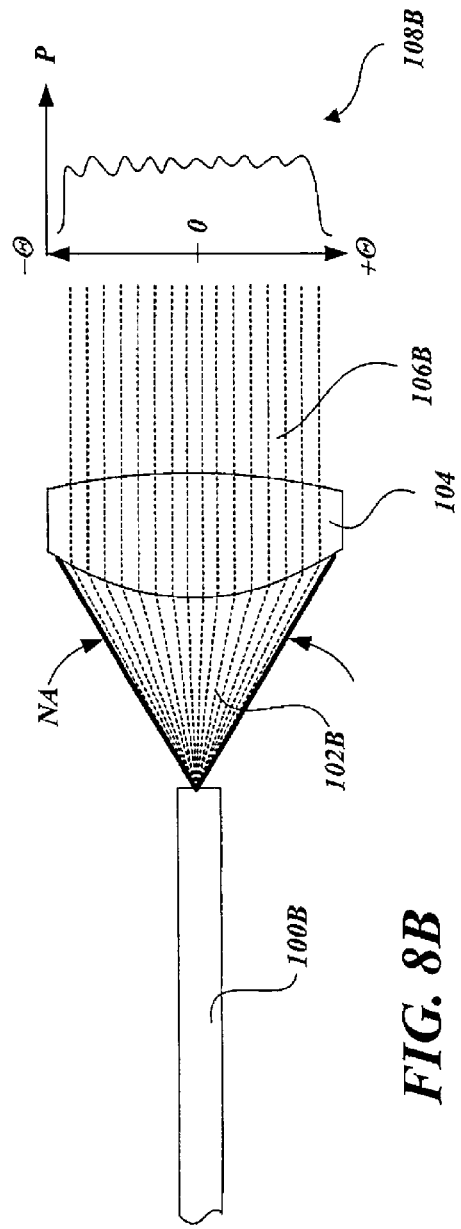
FIG. 8A (Prior Art)
FIG. 8B

OFF-AXIS MODE SCRAMBLER

BACKGROUND OF THE INVENTION

1. Field of the Invention

The present invention generally relates to free-space optical (FSO) communications systems, and, more specifically, to a method and apparatus for improving transmitted signal power and link distance between FSO terminals.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or optical fibers between locations. Thus, wireless optical communications are also known as free-space or atmospheric optical communications. For instance, in a free-space optical communication system, a beam of light is directed through free-space from a transmitter at a first location to a receiver at a second location. Data or information is encoded into the beam of light, and therefore, the information is transmitted through free-space from the first location to the second location.

Transmission of optical signals through free space poses many challenges. Notably, atmospheric conditions can greatly degrade signal strength and link distances. When launching a single-mode beam from a free-space optical terminal, atmospheric scintillation and other wavefront distortion cause the beam to break up into chaotic bright and dark spots. The received signal may have a large fluctuation if the collector size is comparable to the size of the bright and dark spots.

One technique that is used to address these problems is to "scramble" the optical beam, thereby creating a multitude of randomized signals rather than a single mode signal. Mode scrambling may be performed using various techniques and apparatus that are well-known in the art. For example, mechanical mode scramblers have long been used to generate a multimode optical signal. A single mode optical signal is launched from a single mode optical fiber into a multimode optical fiber. The multimode optical fiber is placed in the mode scrambler, which has corrugated surfaces to provide micro-bends in the optical fiber and redistribute energy into all the modes in the multimode optical fiber, resulting in the desired overfilled launch condition. The mechanical mode scrambler physically bends the optical fiber such that the angle of reflection between the optical signal and the core/cladding interface will be altered as the single mode optical signal passes through the portion of the optical fiber being bent. In this way, the single mode launch optical signal will be coupled into many more modes to approximate an overfilled power distribution in the multimode optical fiber. One such mechanical mode scrambler is the FM-1 Mode Scrambler available from Newport Corporation in Irvine, Calif.

Despite the advantages, this type of mode scrambler imposes intolerable strain on the optical fiber when physically bending the optical fiber to alter the angle of reflection. The micro-bending stretches one side of the optical fiber and compresses the other. Because most optical fibers are comprised of glass or plastic, any strain on the optical fibers increases the risk that they will break. Tight bends in optical fiber can cause cracks, which can affect the optical signal traveling through the optical fiber, and will eventually lead to breakage of the optical fiber. A broken or cracked optical fiber will not properly transmit an optical signal.

In addition to problems with optical fiber damage, the characteristics of the scrambled signals produced by conventional mode scrambling techniques are less than optimal. Significantly, the power distribution (i.e., relative intensity vs. angle) of the signal may be asymmetrically skewed and/or peaked, and the numerical aperture is only partially filled. These potentially may lead to substantial signal losses, which may result in erroneous and/or lost data. In addition, mechanical mode scrambling tends to be excessively lossy, reducing the efficiency of the fiber connection.

SUMMARY OF THE INVENTION

The present invention provides an apparatus and method for generating a mode-scrambled optical signal with a substantially-filled numerical aperture in multimode optical fiber. A laser beam source directs a laser optical signal into one end of a first segment of multimode fiber comprising a graded-index (GI) fiber core using an offset launch condition. The first segment of multimode fiber is operatively coupled into a second segment of multimode fiber comprising a step-index (SI) fiber. As the laser optical signal passes through the first and second segments of multimode fiber, the optical signal is converted into a mode-scrambled optical signal having a substantially-filled numerical aperture. In one embodiment, the free end of the first segment of multimode fiber is angled at an acute angle relative to the propagation direction of the laser optical signal. In one embodiment, a portion of the second segment of multimode fiber is configured in a series of alternating loops, which causes the outer portion of the numerical aperture to be more completely filled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 8A and 8B respectively show a mode-scrambled optical signal produced by using a prior art mode-scrambling technique that has an under-filled numerical aperture, and a mode-scrambled optical signal produced by an embodiment of the present invention in which the numerical aperture is substantially filled.

DETAILED DESCRIPTION

Embodiments of an apparatus and method for generating mode-scrambled optical signals are described herein. In the following description, numerous specific details are disclosed to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
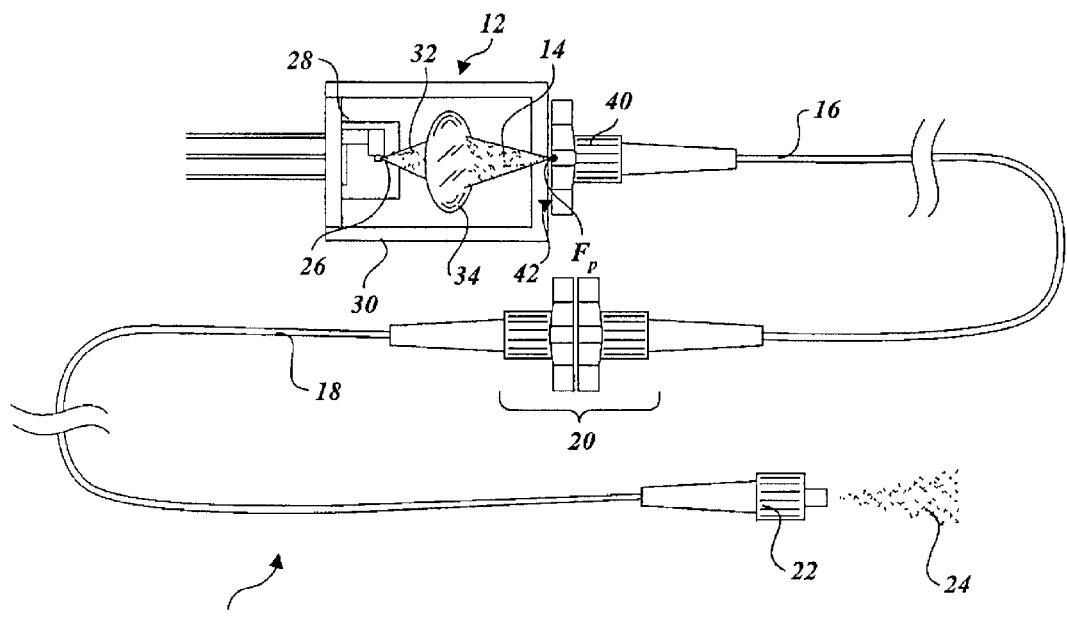
FIG. 1 is a schematic diagram of a mode scrambler in accordance with a first embodiment of the invention.

An off-axis mode scrambler 10 in accordance with a first embodiment of the invention is shown in FIG. 1. Mode scrambler 10 includes a laser beam source 12 that directs a light beam 14 toward an input end of a segment of graded index (GI) multimode optical fiber 16. As used herein, the term "fiber" will generally refer to optical fiber, and the terms fiber and optical fiber are used interchangeably. GI multimode optical fiber segment 16 is coupled to a segment of step-index (SI) multimode optical fiber 18 via a fiber coupler 20. In one embodiment, GI multimode optical fiber segment 16 comprises a 62.5 micrometer (micron or $\mu$m) core, while SI multimode optical fiber segment 18 comprises a 200 $\mu$m core.

As the light beam 14 passes through GI multimode optical fiber segment 16, it begins to be scrambled into a plurality of modes. Upon passing through a GI multimode optical fiber-to-SI multimode optical fiber interface a fiber coupled 20 and passing through SI multimode optical fiber segment 18, the original laser optical signal is emitted from a free end 22 of the SI multimode optical fiber segment as a mode-scrambled laser output 24.

Figure 5:
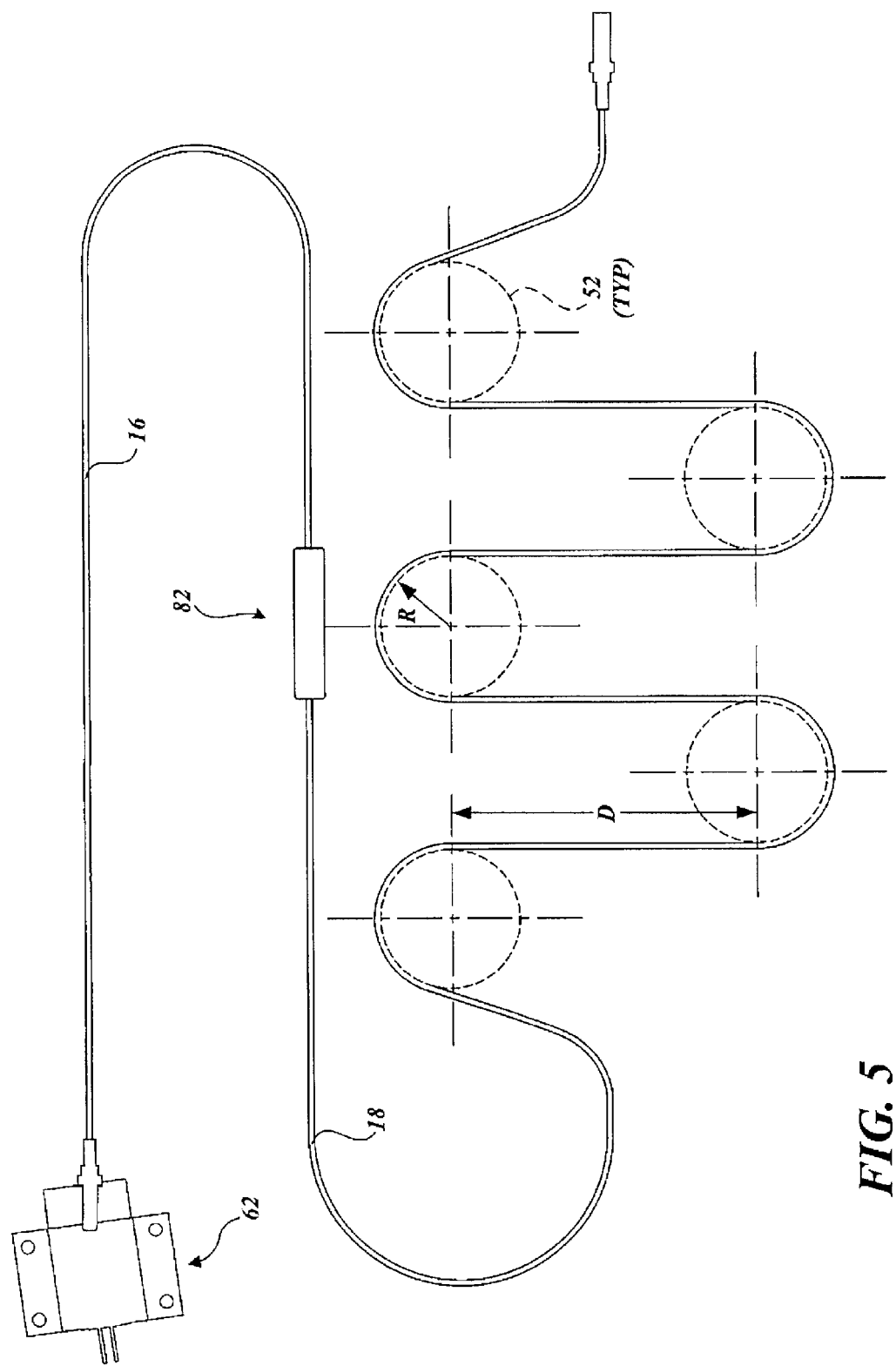
FIG. 5 is a schematic diagram illustrating details of a strain scrambler employed in the embodiment of FIG. 4.

In general, laser beam source 12 may comprise one of many types of laser beam sources that can produce a modulated laser beam. For example, laser beam source 12 includes a laser diode 26 mounted to a first face 28 of a housing 30. Laser diode 26 emits laser light 32, which is received by a focusing optical component 34. In one embodiment, focusing optical component 34 comprises a single optical lens. In another embodiment, as illustrated below in FIGS. 5 and 6, focusing optical component 34 comprises a set of optical lenses. In either case, the single or set of optical lenses is/are operatively coupled to housing 30 such that focusing optical component 34 is held in a fixed relationship to laser diode 26.

Figure 2:
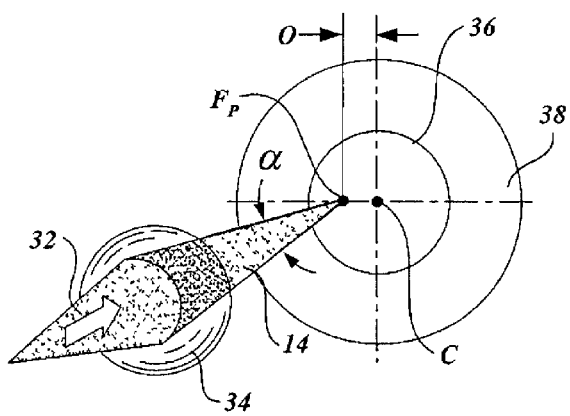
FIG. 2 is a schematic diagram illustrating details of a laser beam that is directed toward a free end of a multimode fiber core.

As further shown in FIG. 2, laser diode 26 and focusing optical component 34 are configured in a manner that results in a light beam 14 being directed toward a focal point $F_p$ that is substantially coincident with the end a fiber core 36 of GI multimode optical fiber segment 16 and offset from a centerline C of the fiber core by an offset distance O. This generates an offset-launched optical signal that is received at the end of the fiber core. In one embodiment, focusing optical component 34 is configured such that a convergence angle $\alpha$ of light beam 14 substantially matches the numerical aperture of fiber core 36.

As further depicted in FIG. 2, fiber core 36 is surrounded by cladding 38. In typical fibers, the fiber cladding is generally surrounded by a protective jacket, made of materials such as polymers. For illustrative purposes, the fiber core, cladding, and protective jacket are shown as a single structure in several of the Figures contained herein for clarity.

In one embodiment, an end portion of GI multimode optical fiber segment 16 is held in a fiber mount 40, which is mounted to an end face 42 of housing 30 such that focal point $F_p$ is substantially coincident with the end of fiber core 36. In general, any suitable means for fixedly mounting the end of fiber core 36 such that it is substantially coincident with focal point $F_p$ may be used.

Figure 3:
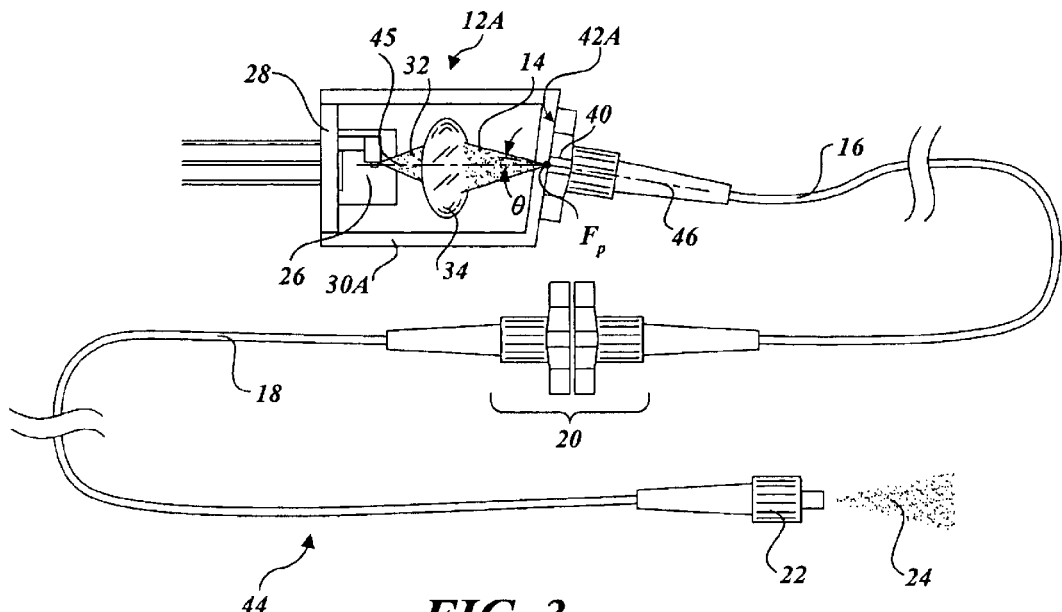
FIG. 3 is a schematic diagram of an offset mode scrambler in accordance with a second embodiment of the invention.

An off-axis mode scrambler 44 in accordance with a second embodiment of the invention is shown in FIG. 3. In this configuration, light beam 14 is directed into fiber core 36 such that an acute angle $\theta$ is formed between respective centerlines 45 and 46 of the light beam and end portion of fiber core 36. The remaining components of offset mode scrambler 44 are substantially similar to like-numbered components discussed above with reference to mode scrambler 10. In an embodiment illustrated in FIG. 3, an end face 42A of a housing 12A is angled relative to centerline 44 such that it forms an angle of 90'—$\theta$ to the first end of GI multimode optical fiber segment 16. As further illustrated in FIG. 3, angle $\alpha$ between centerlines 45 and 46 is created upon mounting fiber mount 40 to end face 42A. An alternative configuration that produces similar results is described below with reference to FIG. 5.

The primary purpose of creating an acute angle between centerlines 45 and 46 is to substantially eliminate any portion of light impinging on the end of fiber core 36 from being reflected back toward laser diode 28. Since free space optical signals comprise a laser beam modulated at very high frequencies, it is desirable to minimize any signal degradation that might result from the reflected light.

Figure 4:
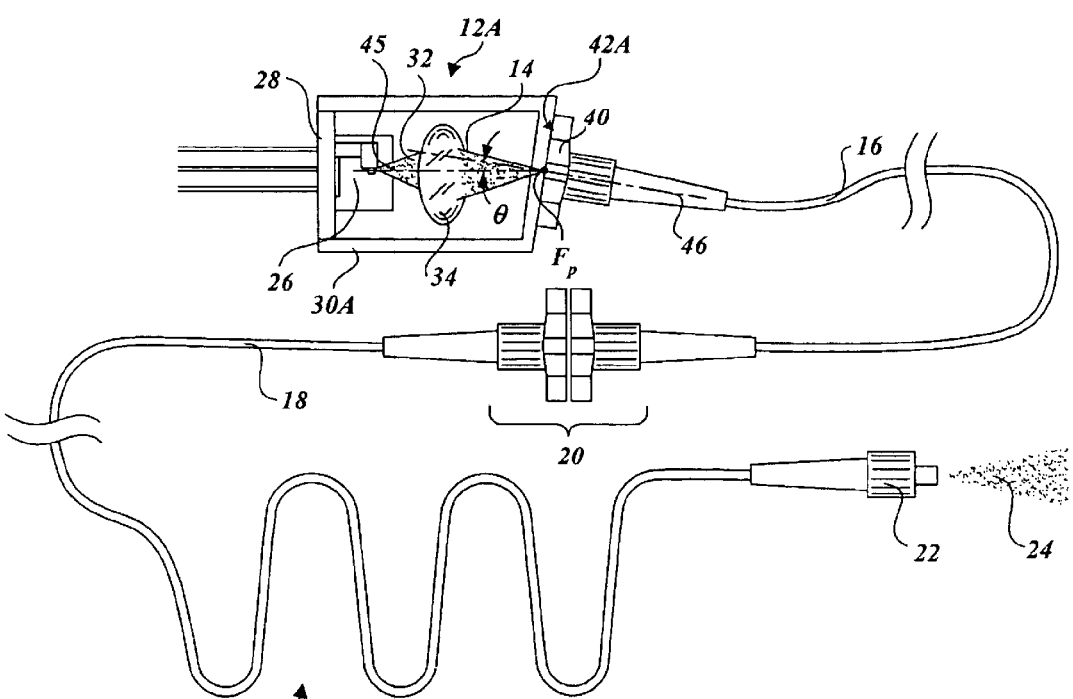
FIG. 4 is a schematic diagram of an offset mode scrambler in accordance with a third embodiment of the invention.
Figure 6:
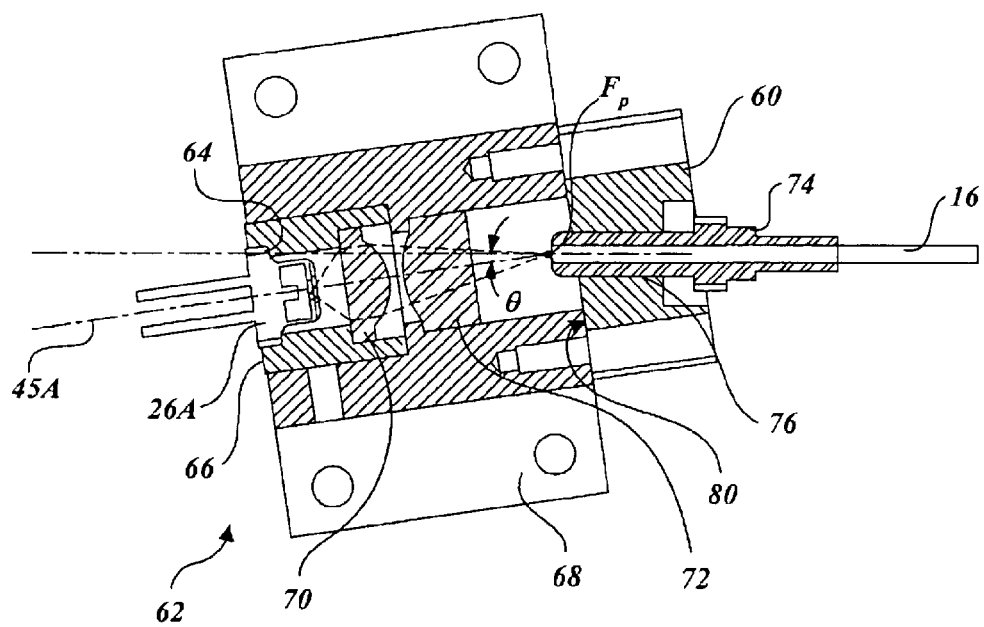
FIG. 6 shows a cross-section detail of an offset fiber mount and laser beam source in accordance with one embodiment of the invention.

An offset-axis mode scrambler 50 in accordance with a third embodiment of the invention is illustrated in FIG. 4. In this configuration, a portion of SI fiber segment 18 is configured as a series of alternating loops. Further details of the alternating loops are shown in FIG. 6. In one embodiment, the alternating loops may be formed by wrapping a portion of SI fiber segment 18 around a plurality of rods 52 in an alternating manner. In general, the radius R of the loops should be large enough to not cause damage to the fiber. In one embodiment, the rods have a diameter of about ½ inch. Additionally, the horizontal distance D between adjacent rods is generally not critical.

Details of an offset fiber mount 60 that is coupled to a laser beam source 62 are shown in FIG. 6. Laser beam source includes a laser diode 26A that is mounted in a recess 64 defined in a first end face 66 of a housing 68. Laser light emitted from laser diode 26A is collimated by a collimating lens 70 and received by a focusing lens 72, which directs the laser light substantially along a centerline 45A toward a focal point $F_p$. An end portion of GI fiber segment 16 is mounted within a collar 74 having a head portion disposed within a counterbored hole 76. Counterbored hole 76 is formed such that its centerline (coincident with a centerline 46A of an end portion of GI fiber segment 16) forms a relative angle of 90—θ between the centerline and a face 80 of offset fiber mount 60.

Figure 7:
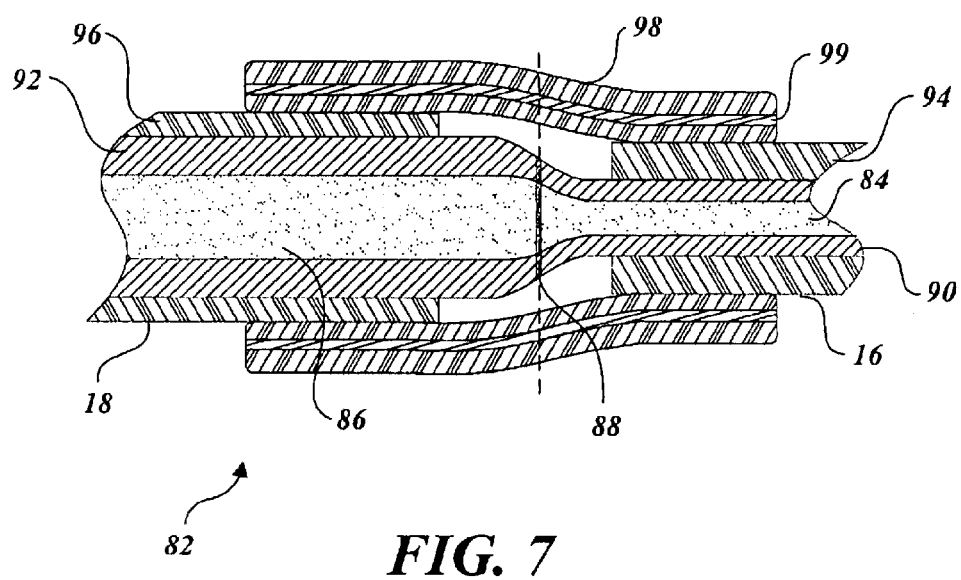
FIG. 7 shows a detailed cross-section of a fusion splice used to couple fiber segments having different core diameters.

In one embodiment, GI multimode fiber segment 16 is coupled to Si multimode fiber segment 18 using a fusion splice. Details of a fusion splice 82 are shown in FIG. 7. In one embodiment, one end of 62.5 μm fiber core 84 is spliced to one end of a 200 μm fiber core 86. At the same time, cladding 90 surrounding 62.5 μm fiber core 84 and cladding 92 surrounding 200 μm fiber core 86 are also fused. The fused portions of the fiber cores and cladding are depicted as a fusion splice 88. Prior to fusing the cores and surround cladding, an end portion of jackets 94 and 96 surrounding cladding 90 and 92, respectively, is stripped back, and the end of the fibers are cleaved. Heat is then applied while holding the ends of the fibers in contact with one another. In one embodiment, a protection sleeve 98 may be used to protect the splice and the exposed cladding. In one embodiment, the protection sleeve comprises a plastic heat-shrink tube with a metal core 99.

In general, the fibers in the fusion splice may have their centerlines co-aligned, as shown in the FIG. 7, or the centers may be offset. It is further noted that the fusion splice illustrated in FIG. 7 shows an idealized fusion splice; in actual practice, there will likely be a discontinuity between the two segments of fiber.

Advantages of Launching an Mode-scrambled Optical Signal with a Substantially-filled Numerical Aperture As discussed above, the embodiments of the invention create a mode-scrambled signal with a substantially-filled numerical aperture. The numerical aperture is basically a measure of the light-gathering ability of the optical fiber and the ease in coupling light into the optical fiber. The to numerical aperture is defined as the sine of the largest angle an incident light beam can have for total internal reflection in the core, and is characterized by $$NA = \sin(\theta) = \sqrt{(n_1)^2 - (n_2)^2}$$

where NA is the numerical aperture, θ is the half angle of the incident light beam, $n_1$ is the index of refraction for the optical fiber core, and $n_2$ is the index of refraction for the optical fiber cladding.

Light rays launched outside the angle specified by the optical fiber's numerical aperture excite optical fiber modes. The greater the ratio of core index of refraction to the cladding index of refraction results in a larger numerical aperture.

Launch conditions corresponding to an underfilled and substantially-filled numerical aperture are illustrated in FIGS. 8A and 8B, respectively, wherein respective optical signals 102A and 102B are launched from optical fiber segments 100A and 100B. As the optical signals impinge upon a collimating lens 104, the signals are collimated into respective transmitted signals 106A and 106B, which are received by a FSO terminal (not shown) to complete the link. In these Figures, the dashed lines illustrate relative intensity values, wherein the heavier the line, the greater the intensity.

Figure 9A:
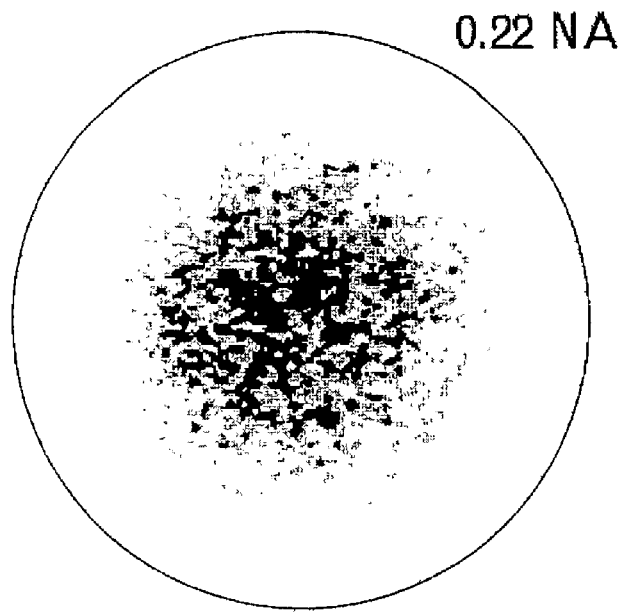
FIGS. 9A and 9B respectively show representations of intensity patterns corresponding to a mode-scrambled signal produced using a conventional mode-scrambling technique, and a mode-scrambled signal produced using a mode-scrambling technique in accordance with one embodiment of the invention.
Figure 9B:
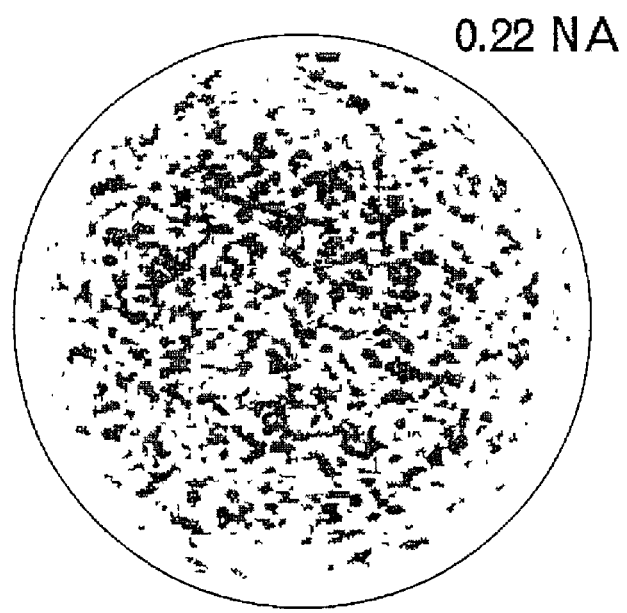

At the right hand of each figure is an intensity distribution diagram that depicts the relative power distribution P of the optical signal vs. angle Θ relative to a centerline of the signal. In reality, the actual intensity distribution comprises a three-dimensional profile, as shown in FIGS. 9A and 9B; the two-dimensional profiles shown in FIGS. 8A and 8B are for illustrative purposes.

Generally, the mode scrambled signals produced by prior art techniques are characterized by an uneven intensity distribution with noticeable peaks and valleys, such as illustrated by an intensity distribution 108A. Furthermore, the power is concentrated toward the center of the transmission signal. In contrast, the signal intensity profile produced by embodiments of the present invention, as illustrated by an intensity distribution 108B, is in the shape of a "top hat," which is a desirable intensity distribution for optical communication. For example, an advantage of the "top hat" intensity distribution is that it allows for more energy to be transmitted out of the transmit aperture than the Gaussian distribution characteristic of a single mode transmission, or large peak and valley profile common to prior art mode-scrambled signals.

Another advantage of launching a mode-scrambled signal with a substantially-filled numerical aperture is that the optical signal is pre-distorted such that effects such as atmospheric scintillation and/or window wave front aberration are small compared to the scrambling generated on the transmitting end. This means that the light beam power distribution at the receiving aperture is more homogenous and the intensity fluctuations caused by atmospheric scintillation and/or window wave front aberration are practically transparent.

Still another advantage of launching a mode-scrambled signal with a substantially-filled numerical aperture is that a more powerful signal can be transmitted without adversely affecting eye safety. For example, the maximum amount of power used for a given optical signal due to eye safety concerns will generally be limited as a function of the peak intensity of the signal, rather than the integrated intensity of the signal. Accordingly, the maximum power used for conventional mode-scrambled signals will be limited by their peak intensities, which are much more pronounced (relative to an average intensity) than that found in the top-hat profile produced by embodiments of the present invention. As a result, the present invention enables more powerful optical signals to be transmitted, while still adhering to safety limitations.

Experimental results have demonstrated the embodiments of the invention discussed above produce mode-scrambled signals with significant improvements in intensity distribution when compared with the prior art. Representations of test results comparing one such conventional mode-scrambling technique with a mode-scrambling technique in accordance with one embodiment of the invention are shown in FIGS. 9A and 9B, respectively. The conventional mode scrambling embodiment used a segment of 62.5 μm fiber spliced into a segment of 200 μm fiber using a convention launch condition (i.e., the laser optical signal was directed toward the center of the free end of the 62.5 μm fiber. In contrast, in accordance with aspects of the invention, the results corresponding to FIG. 9B where obtained using the same segment of 62.5 μm fiber spliced into a segment of 200 μm fiber while employing an offset launch condition in accordance with the invention (i.e., as shown in FIG. 2).

To obtain the intensity patterns, the respective mode-scrambled optical signals were emitted from the free ends of 200 μm fiber and directed at a white wall. An Electrophysics digital infrared camera was then used to photograph the intensity pattern formed on the wall. The infrared images, which comprise differing intensities of red on a substantially black background, where then digitally inverted and converted into 16-color images. The colors in the 16-color images where then remapped into shades of gray and black to produce the images shown in FIGS. 9A and 9B, wherein the darker the region, the higher the intensity.

In general, the results illustrated in FIG. 9A and representative of intensity patterns obtained during testing of various prior art mode-scrambler configurations. For example, prior art configurations that have been tested include using a Newport MF-1 mode scrambler to apply light, medium, and heavy loads to produce various levels of micro-bending in a 62.5 µm fiber, using a 2 meter section of 62.5 µm GI fiber spliced into a 2 meter section of 50 µm fiber SI fiber, which is then spliced into another 2 meter section of 62.5 µm fiber GI fiber, and using a Siecor offset splice mode scrambler. In each instance, the intensity distribution corresponded to a condition in which the numerical aperture was only partially filled, with uneven intensity distribution.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus, comprising:
   a laser beam source to produce a laser optical signal;
   a first segment of multimode fiber comprising a graded-index (GI) fiber core having a first diameter and having a first end positioned to receive the laser optical signal so as to produce an offset-launched optical signal, and a second end; and
   a second segment of multimode fiber comprising a step-index (SI) fiber having a second diameter greater than the first diameter of the first segment of multimode fiber, having a first end operatively coupled to the second end of the first segment of multimode fiber to receive an optical signal output therefrom, and having a second end from which a mode-scrambled optical signal having a substantially-filled numerical aperture is emitted.

2. The apparatus of claim 1, wherein a portion of the second segment of multimode fiber is configured in a series of alternating loops.

3. The apparatus of claim 1, wherein the first segment of multimode fiber comprises a 62.5 micron GI core, and the second segment of multimode fiber comprises a 200 micron Si core.

4. The apparatus of claim 1, wherein an end portion of the first segment of multimode fiber is operatively coupled to the laser beam source such that the offset-launched optical signal produced by the laser beam source is directed at an acute angle relative to a centerline of the end portion.

5. The apparatus of claim 4, further comprising an off-axes fiber optic mount that operatively couples the first end of the first segment of fiber to the laser beam source such that the offset-launched optical signal output from the laser beam source is directed at the acute angle relative to a centerline of the end portion.

6. The apparatus of claim 4, wherein a fiber mount is coupled to the first end of the first segment of fiber, and wherein the laser beam source comprises:

a frame having a longitudinal axis and a first mounting surface disposed toward a first end that is substantially perpendicular to the longitudinal axis and a second mounting surface disposed toward a second end that is angled relative to the first mounting surface and configured to mate with a mounting surface of the fiber mount;
a laser diode, mounted on the first mounting surface to emit a laser optical signal along the longitudinal axis; and
at least one optical component to receive the laser optical signal and converge it towards a focal point to produce the offset-launched optical signal, said focal point being substantially coincident with the first end of the first segment of fiber and offset from a centerline of the fiber at its first end.

7. The apparatus of claim 6, wherein the laser optical signal is converged at an angle that substantially matches a numerical aperture of the first segment of multimode fiber.

8. The apparatus of claim 1, wherein the first segment of fiber is operatively coupled to the second segment of fiber using a fusion splice.

9. The apparatus of claim 1, further comprising an off-axes fiber optic mount that couples an end portion of the first segment of multimode fiber to the laser beam source such that a laser optical signal output from the laser beam source is directed at an acute angle relative to a centerline passing through the end portion.

10. An apparatus, comprising:
    a laser beam source to produce a laser optical signal;
    a first segment of multimode fiber comprising a 62.5 micron graded-index (GI) fiber core having a first end positioned to receive the laser optical signal so as to produce an offset-launched optical signal, and a second end; and
    a second segment of multimode fiber comprising a 200 micron step-index (SI) fiber core, having a first end operatively coupled to the second end of the first segment of multimode fiber, and having a second end, wherein as the offset-launched optical signal passes through the first and second segments of fiber it is converted into a mode-scrambled optical signal having a substantially-filled numerical aperture that is emitted from the second end of the second segment of multimode fiber.

11. The apparatus of claim 10, wherein a portion of the second segment of multimode fiber is configured in a series of alternating loops.

12. The apparatus of claim 10, wherein a fiber mount is coupled to the first end of the first segment of fiber, and wherein the laser beam source comprises:
    a housing having a longitudinal axis and a first mounting surface disposed toward a first end that is substantially perpendicular to the longitudinal axis and a second mounting surface disposed toward a second end of the housing to which the fiber mount is coupled;
    a laser diode, mounted on the first mounting surface to emit a laser optical signal along the longitudinal axis; and
    at least one optical component to receive the laser optical signal and converge it towards a focal point to produce the offset-launched optical signal, said focal point being substantially coincident with the first end of the first segment of fiber and offset from a centerline of the fiber at its first end.

13. The apparatus of claim 12, wherein the second mounting surface is angled relative to the first mounting surface such that the laser optical signal output from the laser beam source is directed at an acute angle relative to a centerline passing through the end portion.

14. The apparatus of claim 12, wherein said at least one optical component causes the laser optical signal to converge at an angle substantially matching a numerical aperture of the 62.5 micron GI fiber core.

15. The apparatus of claim 12, wherein the fiber mount is configured such that the first end of the first segment of multimode fiber is disposed at an offset angle relative to a mounting surface of the fiber mount that mates with the second mounting surface of the housing upon assembly of the fiber mount to the housing.

16. A method for generating a mode-scrambled optical signal, comprising:

operatively coupling a first segment of multimode fiber comprising a graded-index (GI) fiber core having a first diameter to a second segment of multimode fiber comprising a step-index (SI) fiber core having a second diameter greater than the first diameter of the GI fiber core; and directing an optical signal towards a focal point that is substantially coincident with a first end of the first segment of multimode fiber and offset from a centerline of an end portion of the first segment of multimode fiber at its first end to generate an offset-launched optical signal that is received by the first segment of multimode;

wherein, as the offset-launched optical signal passes through the first and second segments of multimode fiber it is converted into a mode-scrambled optical signal having a substantially-filled numerical aperture.

17. The method of claim 16, wherein a portion of the second segment of multimode fiber is configured in a series of alternating loops.

18. The method of claim 16, wherein the optical signal is directed towards the first end of the first segment of multimode fiber such that it is received at an offset angle relative to a centerline of an end portion of the first segment of multimode fiber.

19. The method of claim 16, wherein the first segment of multimode fiber comprises a 62.5 micron GI core, and the second segment of multimode fiber comprises a 200 micron SI core.

20. The method of claim 16, further comprising focusing the optical signal such that it converges at an angle that substantially matches a numerical aperture of the first segment of multimode fiber.

* * * * *